United States Patent
Iwami et al.

(10) Patent No.: US 11,650,599 B2
(45) Date of Patent: *May 16, 2023

(54) POSITIONING DETECTION DEVICE AND WORKING MACHINE HAVING POSITIONING DETECTION DEVICE

(71) Applicant: KUBOTA CORPORATION, Osaka (JP)

(72) Inventors: Kenichi Iwami, Osaka (JP); Akisato Hori, Osaka (JP); Akira Chabata, Osaka (JP); Naohiro Ishikawa, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 267 days.

This patent is subject to a terminal disclaimer.

(21) Appl. No.: 17/106,360

(22) Filed: Nov. 30, 2020

(65) Prior Publication Data

US 2021/0080972 A1    Mar. 18, 2021

Related U.S. Application Data

(63) Continuation of application No. 16/151,704, filed on Oct. 4, 2018, now Pat. No. 10,884,429, which is a (Continued)

(30) Foreign Application Priority Data

Apr. 6, 2016 (JP) .............................. JP2016-076633

(51) Int. Cl.
*G01S 19/49* (2010.01)
*G05D 1/02* (2020.01)
(Continued)

(52) U.S. Cl.
CPC ........... *G05D 1/0278* (2013.01); *A01B 69/00* (2013.01); *G01C 21/165* (2013.01); *G01C 21/26* (2013.01);
(Continued)

(58) Field of Classification Search
CPC ....... G05D 1/0278; G01S 19/49; G01P 21/02; G01C 21/28
See application file for complete search history.

(56) References Cited

U.S. PATENT DOCUMENTS 5,555,503 A    9/1996 Kyrtsos et al.
5,784,029 A    7/1998 Geier
(Continued)

FOREIGN PATENT DOCUMENTS

CN    101082493 A    12/2007
CN    103425134 A    12/2013
(Continued)

OTHER PUBLICATIONS

Extended European Search Report issued on European Patent Application No. 17779007.8 dated Feb. 4, 2020.
(Continued)

*Primary Examiner* — Yuri Kan
(74) *Attorney, Agent, or Firm* — Greenblum & Bernstein, P.L.C.

(57) ABSTRACT

A positioning detection device includes a first obtaining circuit to obtain a satellite signal, a second obtaining circuit to obtain a detection signal of an inertial device, a third obtaining circuit to obtain a traveling state of the vehicle body including straight-traveling and turning of the vehicle body, a first calculator to calculate first positioning information in a satellite navigation system to which the satellite signal is applied, a second calculator to calculate second positioning information in an inertial navigation system to
(Continued)

which the detection signal is applied, a third calculator to calculate third positioning information in a hybrid navigation system to which the first positioning information and the second positioning information are applied, and an output circuit to output the third positioning information upon obtaining the straight-traveling and to output the first positioning information and/or the second positioning information upon obtaining the turning.

17 Claims, 7 Drawing Sheets

Related U.S. Application Data continuation of application No. PCT/JP2017/012691, filed on Mar. 28, 2017.

(51) Int. Cl.
  *G01C 21/26* (2006.01)
  *G01S 19/14* (2010.01)
  *A01B 69/00* (2006.01)
  *G01C 21/16* (2006.01)

(52) U.S. Cl.
  CPC .............. *G01S 19/14* (2013.01); *G01S 19/49* (2013.01); *G05D 1/02* (2013.01); *G05D 2201/0201* (2013.01)

(56) References Cited

U.S. PATENT DOCUMENTS

| | | | |
|---|---|---|---|
| 6,236,924 B1 | 5/2001 | Motz et al. | |
| 6,502,033 B1 | 12/2002 | Phuyal | |
| 6,694,260 B1 | 2/2004 | Rekow | |
| 6,876,920 B1 | 4/2005 | Mailer | |
| 10,884,429 B2 * | 1/2021 | Iwami | ................... A01B 69/00 |
| 2011/0184644 A1 | 7/2011 | Mcburney et al. | |
| 2011/0257920 A1 | 10/2011 | Onda et al. | |
| 2014/0324291 A1 | 10/2014 | Jones et al. | |
| 2017/0261326 A1 * | 9/2017 | Mizutani | ................. G01P 21/02 |

FOREIGN PATENT DOCUMENTS

| | | |
|---|---|---|
| CN | 105203129 A | 12/2015 |
| EP | 2 541 197 A1 | 1/2013 |
| JP | 10-297521 A | 11/1998 |
| JP | 2005-70046 A | 3/2005 |
| JP | 2008-76389 A | 4/2008 |
| JP | 2009-245001 A | 10/2009 |
| JP | 2010-117147 A | 5/2010 |
| JP | 2011-80834 A | 4/2011 |
| JP | 2012-47495 A | 3/2012 |
| JP | 2014-23496 A | 2/2014 |
| JP | 5851360 B2 | 2/2016 |
| JP | 2016-49872 A | 4/2016 |

OTHER PUBLICATIONS

Iida Michihisa et al., "Harvesting Operation by Robot Combine", Proceedings of the 57th Annual Conference of the Institute of Systems, Control and Information Engineers, May 15, 2013, PP.
Uchida Ryo et al., "Path Following Control for Head-feeding Combine Robot", Transactions of the Society of Instrument and Control Engineers, Jan. 31, 2013, pp. P.119-P.124.

* cited by examiner

POSITIONING DETECTION DEVICE AND WORKING MACHINE HAVING POSITIONING DETECTION DEVICE

CROSS-REFERENCE TO RELATED APPLICATIONS

The present application is a continuation application of U.S. patent application Ser. No. 16/151,704, filed on Oct. 4, 2018, which is a continuation application of International Application No. PCT/JP 2017/012691, filed Mar. 28, 2017, which claims priority to Japanese Patent Application No. 2016/076633, filed Apr. 6, 2016. The contents of these applications are incorporated herein by reference in their entirety.

BACKGROUND OF THE INVENTION

Field of the Invention

The present invention relates to a positioning detection device and a working machine having the positioning detection device.

Description of Related Art

A technique disclosed in Japanese Unexamined Patent Application Publication No. 2016-049872 is previously known as a technique for performing the positioning relating to a position of a working machine such as a tractor, a combine, and a rice transplanter in accordance with the satellite navigation and the inertial navigation. In addition, a technique disclosed in Japanese Unexamined Patent Application Publication No. 2009-245001 is also previously known as a technique for performing the positioning of a working machine with use of a gyro device and a radio wave transmitted from a GPS satellite.

The working machine disclosed in Japanese Unexamined Patent Application Publication No. 2016-049872 employs a satellite navigation mode to output the first autonomous steering data used for a traveling vehicle body traveling along a target traveling route with use of the target traveling route and the positioning data using a satellite navigation module and an inertial navigation mode to output the second autonomous steering data used for the traveling vehicle body traveling along the target traveling route with use of the target traveling route and the positioning data using an inertial navigation module.

In addition, the working machine of Japanese Unexamined Patent Application Publication No. 2009-245001 includes a GPS position information calculation means for receiving radio waves transmitted from the GPS satellites and obtaining the position information of the vehicle body at intervals of set time, and a gyro device configured to detect direction displacement information of the vehicle body.

SUMMARY OF THE INVENTION

A positioning detection device includes a first obtaining circuit disposed on a vehicle body having a working device or on the working device and configured to obtain a satellite signal from a navigation satellite, a second obtaining circuit to obtain a detection signal of an inertial device, a third obtaining circuit to obtain a traveling state of the vehicle body, the traveling state including at least straight-traveling of the vehicle body and turning of the vehicle body, a first calculator to calculate first positioning information in accordance with a satellite navigation system to which the satellite signal obtained by the first obtaining circuit is applied, the first positioning information being information on positioning, a second calculator to calculate second positioning information in accordance with an inertial navigation system to which the detection signal obtained by the second obtaining circuit is applied, the second positioning information being information on positioning, a third calculator to calculate third positioning information in accordance with a hybrid navigation system to which the first positioning information and the second positioning information are applied, the third positioning information being information on positioning, and an output circuit to output the third positioning information when the third obtaining circuit obtains the straight-traveling of the vehicle body, the third positioning information being calculated by the third calculator, and output the first positioning information and/or the second positioning information when the third obtaining circuit obtains the turning of the vehicle body, the first positioning information being calculated by the first calculator, the second positioning information being calculated by the second calculator.

A positioning detection device includes a first obtaining circuit disposed on a vehicle body having a working device or on the working device and configured to obtain a satellite signal from a navigation satellite, a second obtaining circuit to obtain a detection signal of an inertial device, a third obtaining circuit to obtain a traveling state of the vehicle body, the traveling state including at least straight-traveling of the vehicle body and turning of the vehicle body, a first calculator to calculate first positioning information in accordance with a satellite navigation system to which the satellite signal obtained by the first obtaining circuit is applied, the first positioning information being information on positioning, a second calculator to calculate second positioning information in accordance with an inertial navigation system to which the detection signal obtained by the second obtaining circuit is applied, the second positioning information being information on positioning, a third calculator to calculate third positioning information in accordance with a hybrid navigation system to which the first positioning information and the second positioning information are applied, the third positioning information being information on positioning, and a calculation setting circuit to perform calculation processes of the first calculator, the second calculator, and the third calculator, the calculation setting circuit being configured to perform the calculation process of the third calculator when the third obtaining circuit obtains the straight-traveling of the vehicle body, and stop the calculation process of the third calculator when the third obtaining circuit obtains the turning of the vehicle body and to start the calculation process of the first calculator and/or the calculation process of the second calculator.

A positioning detection device, which is connected to a controller for controlling an operation of a working machine having a vehicle body and a working device attached thereto. The positioning detection device is disposed on the vehicle body or the working device and configured to be controlled by a program to obtain a satellite signal from a navigation satellite, obtain a detection signal of an inertial device, obtain a traveling state of the vehicle body, the traveling state including at least straight-traveling of the vehicle body and turning of the vehicle body, calculate first positioning information in accordance with a satellite navigation system to which the satellite signal is applied, calculate second positioning information in accordance with an inertial navigation system to which the detection signal is applied, calculate third positioning information in accordance with a hybrid navigation system to which the first positioning information and the second positioning information are applied, output the third positioning information to the controller upon obtaining the straight-traveling of the vehicle body, and output the first positioning information and/or the second positioning information to the controller upon obtaining the turning of the vehicle body.

A working machine includes a vehicle body, a working device attached to the vehicle body, a controller configured to control an operation of the working machine, and a positioning detection device connected to the controller and disposed on the vehicle body or on the working device. The positioning detection device is configured to be controlled by a program to obtain a satellite signal from a navigation satellite, obtain a detection signal of an inertial device, obtain a traveling state of the vehicle body, the traveling state including at least straight-traveling of the vehicle body and turning of the vehicle body, calculate first positioning information in accordance with a satellite navigation system to which the satellite signal is applied, calculate second positioning information in accordance with an inertial navigation system to which the detection signal is applied, calculate third positioning information in accordance with a hybrid navigation system to which the first positioning information and the second positioning information are applied, output the third positioning information to the controller upon obtaining the straight-traveling of the vehicle body, and output the first positioning information and/or the second positioning information to the controller upon obtaining the turning of the vehicle body.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
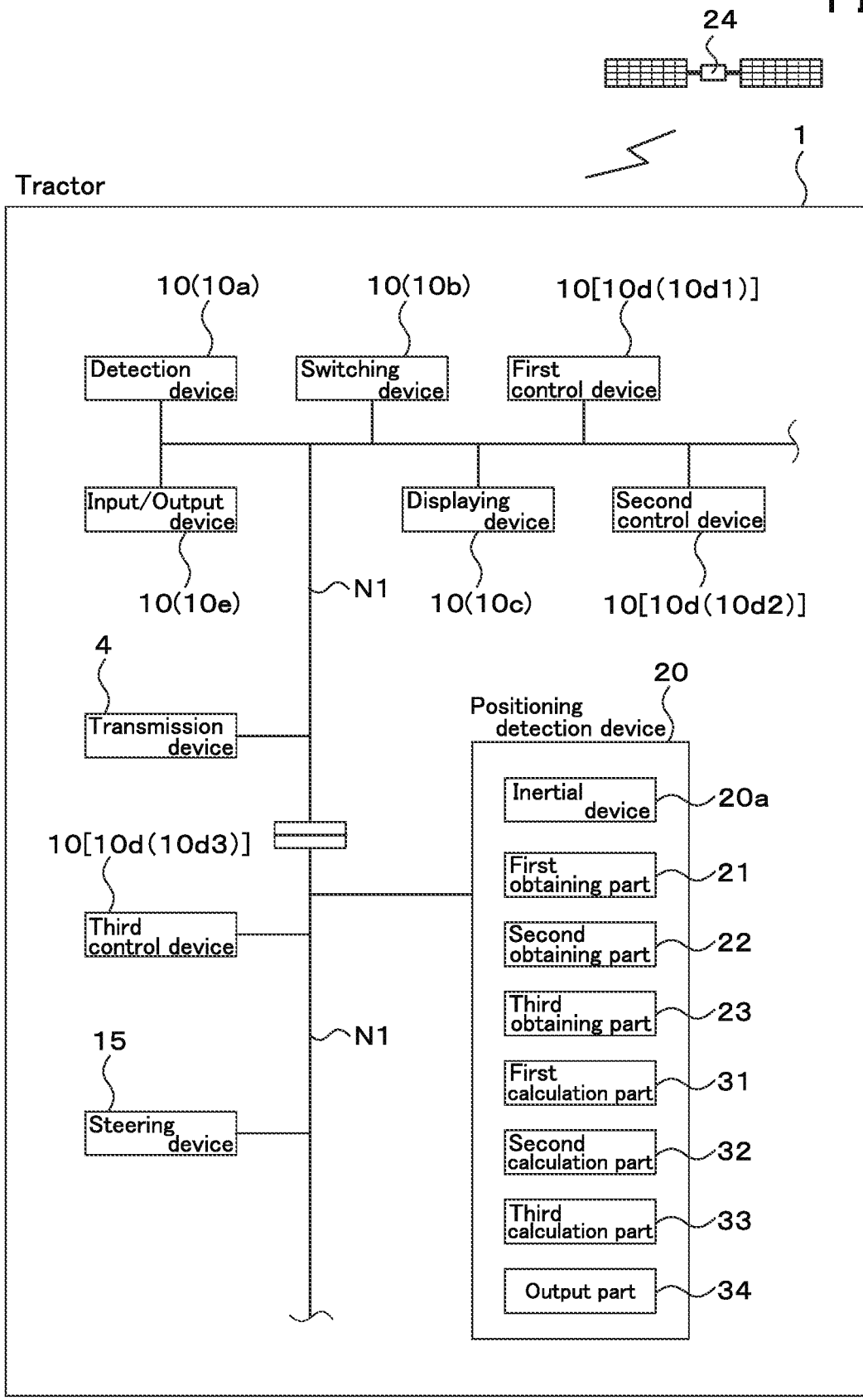
FIG. 1 is a view illustrating a block diagram of a tractor and a positioning detection device according to a first embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, embodiments of the present invention will be described with reference to the drawings.

The positioning detection device according to the embodiments of the present invention is a device configured to detect the position, direction, and the like of a working machine in accordance with the satellite navigation system (GNSS: Global Navigation Satellite System) and the inertial navigation system (INS: Inertial Navigation System). The working machine is an agricultural machine such as a tractor, a combine, a rice transplanter or a construction machine such as a backhoe, a loader, and the like.

First Embodiment

<Overall Configuration of Tractor (Outline)>

Hereinafter, taking the tractor as an example, a positioning detection device and the like will be described.

Figure 7:
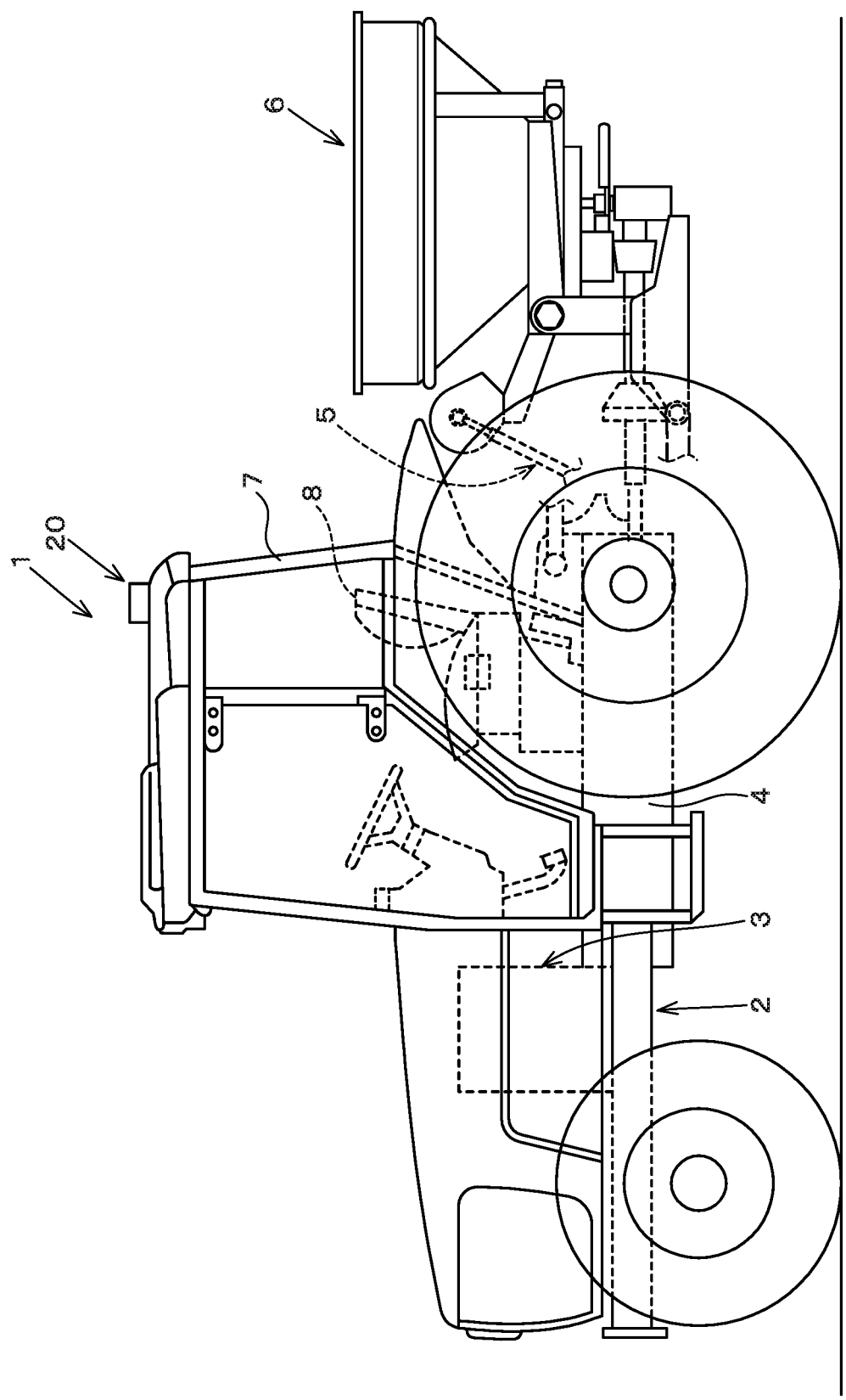
FIG. 7 is an overall view of the tractor coupled to a working device according to the embodiments.

FIG. 1 shows a block diagram of the tractor and the positioning detection device. In addition, FIG. 7 is an overall side view of the tractor, showing a view in which the tractor is coupled to a working device. For convenience of the explanation, the explanation will be provided, assuming that the front side (the left side in FIG. 7) of the operator seated on the operator seat 8 is referred to as the front, the rear side (the right side in FIG. 7) of the operator is referred to as the rear, the left side (the front surface side of FIG. 7) of the operator is referred to as the left, and the right side (the back surface side of FIG. 7) of the operator is referred to as the right.

As shown in FIG. 7, the tractor 1 includes a vehicle (vehicle body) 2 having wheels to travel, a prime mover 3 such as a diesel engine (an engine), and a transmission device 4 for allowing the speed changing. The prime mover 3 may be constituted of a motor or both of a motor and an engine. On the rear portion of the vehicle body 2, a three-point link mechanism 5 is provided so as to be movable up and down. The working device 6 can be attached to and detached from the three-point link mechanism 5. Driving power from the prime mover 3 is transmitted to the working device 6 through the PTO shaft. The working device 6 is a tilling device for the tilling, a fertilizer spraying device for spraying fertilizer, an agricultural chemical spraying device for spraying agricultural chemicals, a harvesting device for the harvesting, and the like. In FIG. 7, an example in which the fertilizer spraying device is attached to the tractor is shown. The working device 6 is not limited to the above-mentioned examples, and may be constituted of any other type of devices.

A cabin 7 is provided behind the prime mover 3. An operator seat 8 is provided in the cabin 7. A positioning detection device 20 is provided on the top plate of the cabin 7. That is, the positioning detection device 20 is attached to the vehicle body 2 having the working device 6 by the cabin 7. It should be noted that the positioning detection device 20 may be attached to the working device 6.

As shown in FIG. 1, a plurality of devices 10 are mounted on the tractor 1. The device 10 is a device constituting the tractor 1, and includes, for example, a detection device 10a, a switching device 10b, a display device 10c, a control device 10d, and an input/output device 10e. The detection device 10a is a device configured to detecting the operating state of the tractor 1, and includes an accelerator pedal sensor, a shift lever detection sensor, a crank position sensor, a fuel sensor, a water temperature sensor, an engine revolutions sensor, a steering angle sensor, a fluid temperature sensor, an axle rotation sensor, or the like. The switching device 10b is a device configured to perform the switching, and is an ignition switch, a parking brake switch, a PTO switch, or the like. The display device 10c is a device configured to display various items relating to the tractor 1, and is a liquid crystal type display device constituted of liquid crystal or the like. The control device 10d is a device configured to control the tractor, and is a CPU or the like. The input/output device 10e is a device configured to output data inside the tractor 1 to the outside of the tractor 1 and to input data outside the tractor 1 into the tractor 1, and is, for example, a communication device configured to transmit and receive the data in the wireless manner or the wired manner.

The plurality of devices 10 are connected to each other by an in-vehicle network N1 such as the CAN, the LIN, the FlexRay, or the like. To the vehicle communication network N1, a detection signal detected by the detection device 10a, a switching signal indicating the switching of the switching device, and a command signal (a control signal) to operate an operating portion (for example, an engine, a solenoid valve, a pump, and the like) in which the tractor 2 operates under the control of the control device, and the like are outputted.

The control device 10d includes a first control device 10d1, a second control device 10d2, and a third control device 10d3. The first control device 10d1 is a device configured to control a whole of the tractor 2. The first control device 10d1 receives a detection value detected by the detection device 10a (for example, an operation extent of the accelerator pedal, a shift lever position (a gear position) at the time of operation of the shift lever, an engine revolutions speed, a gear position, an fluid temperature, a crank angle position, a cam position, and the like). The first control device 10d1 outputs a control command to the second control device 10d2 so that the engine revolutions reaches a predetermined speed on the basis of the operation extent of the accelerator pedal, and controls the transmission device 4 (the shift control) on the basis of the shift lever position. In addition, the first control device 10d1 controls elevation of the three-point link mechanism 5 on the basis of an input from the operation member (the elevation control).

The second control device 10d2 is a device that mainly controls the engine 3. The second control device 10d2 controls an injector, a common rail, a supply pump, and the like on the basis of the inputs of the operation extent of the accelerator pedal, the crank position, the cam position, and the like. In the engine control by the second control device 10d2, the fuel injection amount, the injection timing, and the fuel injection rate are, for example, set in the control of the injector, and the fuel injection pressure is set in the control of the supply pump or the common rail.

The third control device 10d3 is a device configured to control the autonomous traveling of the tractor 1. The third control device 10d3 controls the steering device (a steering) 15 configured to change the direction of the vehicle body 2 and the like on the basis of various information detected by the positioning detection device 20, and thereby performing the autonomous traveling.

<Autonomous Traveling of Tractor>

The autonomous traveling of the tractor 1 will be described below. In the autonomous traveling of the tractor 1, a route for the autonomous traveling of the tractor 1 is set using a computer such as a Personal Computer (a PC), a smartphone (a multi-function mobile phone), a tablet, or the like.

Figure 2:
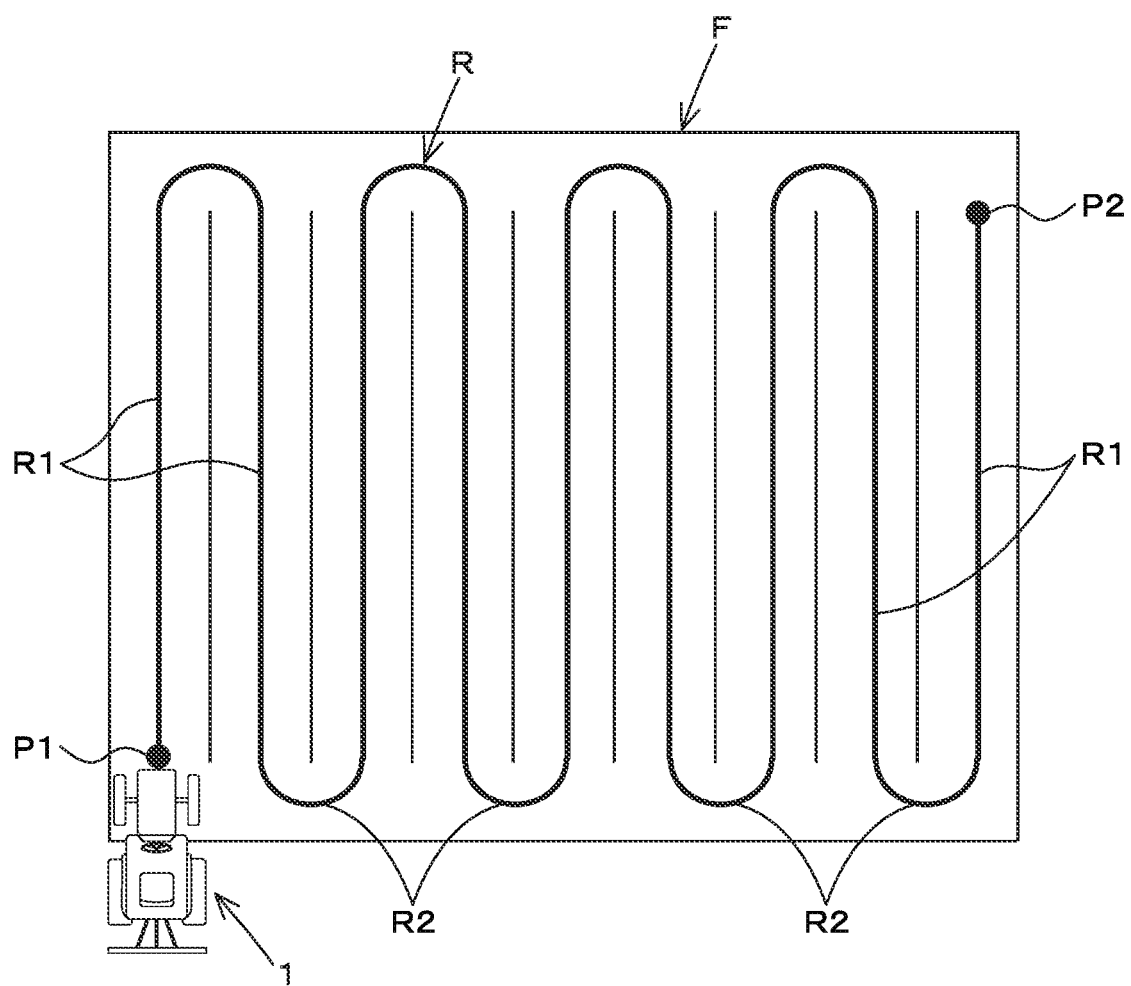
FIG. 2 is a view illustrating an example of a route of autonomous traveling of the tractor according to the first embodiment.

FIG. 2 shows an example of the route of the autonomous traveling of the tractor. In setting the route of the autonomous traveling, that is, in setting the traveling schedule, a working place (an agricultural field and the like) F where the operation is carried out by the tractor 1 is displayed on the display part of the computer as shown in FIG. 2. The route R for the autonomous traveling of the tractor 1 is set in the working place F displayed on the display device of the computer. For example, in the working place F, a traveling start position P1 of the tractor 1, a traveling end position P2, and the route R from the traveling start position P1 to the traveling end position P2 are set using an interface or the like of the computer. The route R shown in FIG. 2 includes a straight-traveling section R1 for straightly moving the tractor 1, and a turning section R2 for turning the tractor 1. In the setting of the route, the working place F on the displaying part is related to the traveling start position P1, the traveling end position P2, the straight traveling section R1 and the turning section R2, the position (latitude and longitude), and at least the position relating to the traveling start position P1, the travel end position P2, the straight traveling section R1, and the turning section R2 is determined on the display portion of the computer, thereby setting the route of the autonomous traveling. In addition, in the setting of the route of autonomous traveling, the route may be divided into predetermined sections, and either the forward traveling or the backward traveling may be assigned to each section. Meanwhile, the setting of the route of the autonomous traveling shown in FIG. 2 is an example, and is not limited to the example. In addition, the setting of the route of the autonomous traveling may be performed by a device mounted on the tractor 1, and is not limited to the above-mentioned computer.

The third control device 10d3 stores information on the autonomous traveling of the tractor (referred to as autonomous traveling information). For example, the autonomous traveling information set by the computer is transmitted to the input/output device 10e of the tractor 1 in a wireless manner or in a wired manner. Then, by writing the autonomous traveling information received by the input/output device 10e to the third control device 10d3, the third control device 10d3 can store the autonomous traveling information. In the third control device 10d3, for example, the travel start position P1, the travel end position P2, the positions of the straight traveling section R1 and the turning section R2, and the like are stored as the autonomous traveling information. As described above, when the sections of the traveling directions (the forward traveling and the backward traveling) of the tractor 1 are allocated in the setting of the route, the forward traveling and the backward traveling may be stored in the third control device 10d3.

When performing the autonomous traveling of the tractor 1, the third control device 10d3 refers to the position (a target position) indicated by the autonomous traveling information, and controls the steering device 15 so that the position (a detected position) detected by the positioning detection device 20 and the position indicated by the autonomous traveling information (the target position) coincide with each other. For example, in the case where the target position and the detected position coincide with each other when the tractor 1 is traveling on the straight section R1 indicated by the route R, the third control device 10d3 maintains the steering angle provided by the steering device 15 to zero. In the case where the target position and the detected position coincide with each other when the tractor 1 is traveling on the turning section R2 indicated by the route R, the third control device 10d3 sets the steering angle provided by the steering device 15 to the angle indicated by the turning section R2. In addition, in the case where there is a deviation more than a predetermined extent between the detected position and the target position, the third control device 10d3 controls the steering device 15 such that the deviation is eliminated to match both of the detected position and the target position with each other, and thereby corrects the traveling position of the tractor 1. Meanwhile, in the case where the forward traveling and the backward traveling are indicated on the route of the autonomous traveling, the third control device 10d3 controls the transmission device 4 to switch the tractor 1 between the forward traveling and the backward traveling.

The third control device 10d3 outputs the traveling information to the positioning detection device 20. For example, the third control device 10d3 outputs, to the positioning detection device 20, the current traveling state of the tractor 1 such as the straight traveling (the forward traveling and the backward traveling), the turning, the stopping, and the like as traveling information. In the case where the tractor 1 is traveling along the route R, the third control device 10d3 outputs the information indicated by the route R on the basis of the autonomous traveling information. For example, in the case where the tractor 1 is traveling forward or backward along the straight traveling section R1, the third control device 10d3 outputs the traveling information to the positioning detection device 20, the traveling information indicating that the tractor 1 is traveling forward or backward. The third control device 10d3 may output the traveling information representing the straight traveling to the positioning detection device 20 instead of the forward traveling and the backward traveling. In addition, in the case where the tractor 1 is turning along the turning section R2, the third control device 10d3 outputs the traveling information to the positioning detection device 20, the traveling information indicating that the tractor 1 is turning. In addition, in the case where the tractor 1 is stopping in the autonomous traveling, the third control device 10d3 outputs the traveling information to the positioning detection device 20, the traveling information indicating that the tractor 1 is stopping.

Meanwhile, in the case where the tractor 1 travels considerably off away from the preliminarily set route R, the third control device 10d3 may output the current traveling state of the tractor 1 to the positioning detection device 20 on the basis of the operation information (the forward traveling and the backward traveling) of the transmission 4, the operation information (the steering angle) of the steering device 15, or the like. In addition, the third control device 10d3 outputs the autonomous traveling information and the like as traveling information to the positioning detection device 20. The third control device 10d3 may output the traveling information to the first control device 10d1 and the second control device 10d2. In addition, in order to obtain the positioning information of the tractor 1 at the time of the autonomous traveling in the working place (an agricultural field) F, a base station may be installed in the vicinity of the field F, and the positioning information of the tractor may be obtained in accordance with the kinematic method (the RTK method) to apply the observation correction information obtained from the base station to the positioning detection device 20, and may be obtained without using the RTK method.

As described above, the first control device 10d1, the second control device 10d2, and the third control device 10d3 can control the traveling system of the tractor 1 and the working system. Meanwhile, the control of the traveling system and the working system of the tractor 1 is not limited to the control described above.

<Configuration of Positioning Detection Device>

Next, the positioning detection device 20 will be described.

The positioning detection device 20 is a device configured to detect at least the position (the latitude, the longitude, and the like) and the direction (an angle of the direction) of the tractor 1. As shown in FIG. 1, the positioning detection device 20 includes an inertial device 20a, a first obtaining part 21, a second obtaining part 22, and a third obtaining part 23.

The inertial device 20a is constituted of a sensor configured to detect the acceleration and the angular velocity, that is, constituted of an acceleration sensor, a gyro sensor, or the like. In addition, the first obtaining part 21, the second obtaining part 22, and the third obtaining part 23 are constituted of electronic/electric parts, programs, or the like provided in the positioning detection device 20. The first obtaining part 21 is configured to obtain the satellite signals outputted from the positioning satellites 24 such as the GPS, the satellite signals being received by the positioning detection device 20. The second obtaining part 22 is configured to obtain as the detection signals the detection signal detected by the inertial device 20a, and, for example, obtain the acceleration detected by the acceleration sensor and the angular velocity detected by the gyro sensor. The third obtaining part 23 is configured to obtain the traveling information and, for example, obtain as the traveling information the straight traveling (the forward traveling and the backward traveling) of the vehicle body 2, the turning of the vehicle body 2, and the stopping of the vehicle body 2 in the case where the tractor 1 carries out the autonomous traveling.

Thus, in the traveling of the tractor 1, the positioning detection device 20 is configured to obtain the satellite signal outputted from the GPS satellite or the like, the acceleration of the case where a posture or the like of the vehicle body 2 is changed during the traveling, the angular velocity, the traveling information of the vehicle body [the straight traveling (the forward traveling and the backward traveling), the turning, and the stopping].

The positioning detection device 20 detects the position and the like of the vehicle body 2 with use of the information obtained by the first obtaining part 21 and the second obtaining part 22. The positioning detection device 20 includes a first calculation part 31, a second calculation part 32, and a third calculation part 33. The first calculation part 31, the second calculation part 32, and the third calculation part 33 are constituted of electronic/electric parts, programs, and the like provided in the positioning detection device 20.

Figure 3:
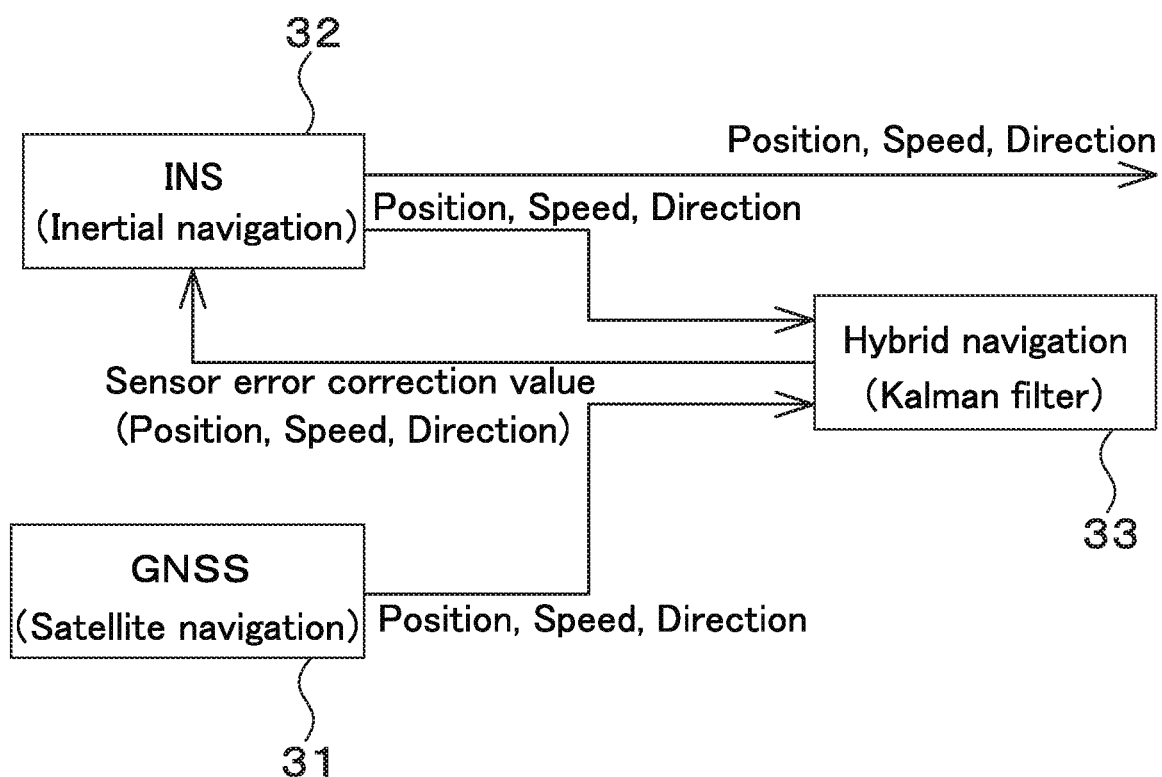
FIG. 3 is a view illustrating a process by a calculation part according to the first embodiment.

As shown in FIG. 3, the first calculation part 31 calculates the first positioning information that is the positioning information by applying the satellite signal to the satellite navigation system (GNSS), the satellite signal being obtained by the first obtaining part 21. The first calculation part 31 calculates the position, the speed, and the direction as the first positioning information, for example, on the basis of the satellite signal (the GNSS data) transmitted from the GPS satellite or the like. The positioning satellite is not limited to the GPS satellite, and may be the GLONASS satellite or other satellites.

As shown in FIG. 3, the second calculation part 32 calculates the second positioning information that is the positioning information by applying the detection signal to the inertial navigation system (INS), the detection signal being obtained by the second obtaining part 22. The second calculation part 32 calculates the position, the speed, and the direction, for example, on the basis of the acceleration detected by the acceleration sensor and the angular velocity detected by the gyro sensor.

As shown in FIG. 3, the third calculation part 33 calculates the third positioning information that is the positioning information by applying to the Kalman filter the first positioning information (the position, the speed, and the direction) and the second positioning information (the position, the velocity, and the direction), the first positioning information being obtained by the satellite navigation system (GNSS), the second positioning information being obtained by the inertial navigation system (GNSS). That is, the third calculation part 33 calculates the position, the velocity, and the direction of the third positioning information in accordance with the hybrid navigation system (the combined navigation system). The parameter setting of the hybrid navigation system (the combined navigation system) in the third calculation part 33 employs the setting method that emphasizes accuracy in the straight traveling. Meanwhile, the Kalman filter is disclosed in many published documents, and is disclosed, for example, in Japanese Unexamined Patent Application Publication No. 2004-239643. In addition, in the case where the third calculation part 33 calculates the direction of the backward traveling, the direction of the backward traveling is obtained by inverting the direction of the forward traveling by 180 degrees.

Thus, regardless of whether the tractor 1 is traveling or not (regardless of the traveling states), the positioning detection device 20 calculates the first positioning information (the position, the speed, and the direction) in accordance with the GNSS, the second positioning information (the position, the speed, and the direction) in accordance with the INS, and the third positioning information (the position, the speed, and the direction) in accordance with the hybrid navigation system.

As shown in FIG. 1, the positioning detection device 20 includes an output part 34 configured to change the positioning information (the first positioning information, the second positioning information, and the third positioning information) to be outputted to the outside on the basis of the traveling states of the tractor 1. The traveling states of the tractor 1 are the states of the vehicle body 2 such as the straight traveling (the forward traveling and the backward traveling, the turning, the stopping, and the like, and is the traveling information obtained from the third control device 10d3 by the third obtaining part 23 in the tractor 1 configured to perform the autonomous traveling. The output part 34 is connected to the in-vehicle network N1 of the tractor 1, and is configured to change the positioning information to be output to the third control device 10d3 in accordance with the traveling information obtained by the third obtaining part 23.

Figure 4:
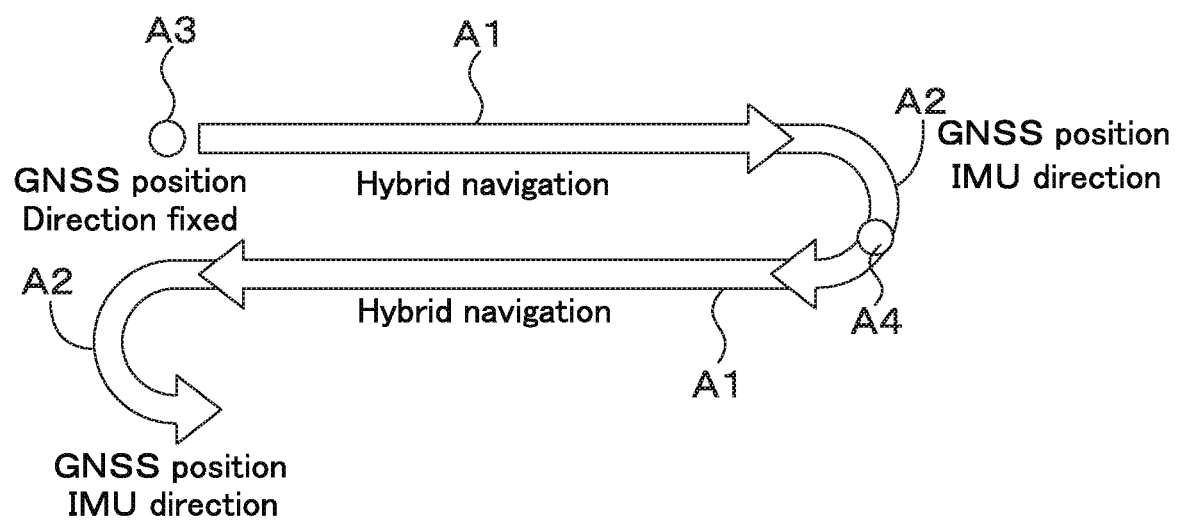
FIG. 4 is a view illustrating an example of a traveling state of the tractor according to the first embodiment.

FIG. 4 is a view showing an example of the traveling state of the tractor 1. As shown by the straight traveling state in FIG. 4, in the case where the tractor 1 is traveling straight, that is, in the case where the third obtaining part 23 obtains either one of the straight traveling states (the forward traveling state and the backward traveling state), the output part 34 outputs the third positioning information to the third control device 10d3 (to the in-vehicle network N1), the third positioning information being calculated by the third calculation part 33. In particular, in the case where the tractor 1 autonomously traveling is in either one of the straight traveling states (the forward traveling state and the backward traveling state), the output part 34 outputs, to the third control device 10d3, the position and direction of the position, the speed, and the direction obtained in accordance with the hybrid navigation system.

As shown by the turning state A2 in FIG. 4, in the case where the tractor 1 is turning, that is, in the case where the third obtaining part 23 obtains the turning, the output part 34 outputs, to the third control device 10d3, the first positioning information calculated by the first calculation part 31 and/or the second positioning information calculated by the second calculation part 32.

In particular, in the case where the tractor 1 autonomously traveling is turning, the output part 34 outputs, to the third control device 10d3, the direction (the INS direction) of the position, the speed, and the direction obtained by the inertial navigation system (the INS). In addition, in the case where the tractor 1 is turning, the output part 34 outputs regarding the information of the position, to the device 10d3, not the position obtained in accordance with the inertial navigation system but the position (the GNSS position) obtained by the first calculation part 31.

In addition, as shown by the stopping state A3 in FIG. 4, in the case where the tractor 1 is in the stopping state from being in the traveling state other than the turning state (in the case where the third obtaining part 23 obtains the stopping state after the traveling state other than the turning state), that is, in the case where the tractor 1 stops after traveling straight, the output part 34 outputs the last direction calculated just before the stopping of the direction calculated by the third calculation part 33, and then fixes the direction (the fixed direction). As shown by the stopping state A4 in FIG. 4, in the case where the tractor 1 is in the stopping state halfway from being in the turning state (in the case where the third obtaining part 23 obtains the stopping state after the turning state), the output part 34 outputs the last direction calculated by the second calculation part 32 just before the stopping, and then fixes the direction (the fixed direction).

Meanwhile, in the case where the tractor 1 is stopping, the output part 34 outputs the position (the GNSS position) obtained by the first calculation part 31. The output part 34 outputs the positioning information toward the third control device 10d3 (the in-vehicle network), but in addition to that, the output part 34 may obtain the positioning information to the outside of the tractor 1. That is, the positioning detection device 20 may be provided with an external output terminal, and thus may output the positioning information to the external output terminal.

As described above, the positioning detection device 20 includes the first calculation part 31, the second calculation part 32, and the third calculation part 33. Thus, a position of the working machine can be obtained in accordance with the satellite navigation system, the inertial navigation system, the Kalman filter (the hybrid navigation system). In addition, the positioning detection device 20 includes an output part 34. Thus, it is possible to output adequate positioning information of the working machine on the basis of the traveling state of the working machine.

In particular, in the case where the working machine is traveling straight, the output part 34 can output the positioning information (the position, the direction, and the like) calculated in accordance with the hybrid navigation system with high accuracy. For example, in the agricultural working in an agricultural field or the like, the tilling, the fertilization, and other operations are carried out by the agricultural machine at the time of traveling straight, and thus high precision (high resolution) is required for positioning at the time of the straight traveling. In some cases, it is desirable to perform the positioning with precision by a few centimeters (one to five centimeters), and when the working machine or the like outputs the positioning information obtained in accordance with the hybrid navigation system, the working machine and the like obtains the positions and directions with high accuracy in the straight traveling during the agricultural working.

In addition, in the case where the working machine is turning, the output part 34 can output the positioning information (the direction and the like) calculated in accordance with the inertial navigation system with high accuracy. For example, the agricultural machines often perform the turning (the swiveling) in the agricultural field, and thus it is required to maintain the high precision in the turning. By outputting, as the positioning information, the direction obtained in accordance with the inertial navigation system, it is possible for the working machine or the like to obtain the direction with high accuracy at the time of the turning in the agricultural working. In addition, in the case where the working machine is turning, the output part 34 outputs the position obtained in accordance with the satellite navigation system, regarding the position. Thus, it is possible for the working machine or the like to obtain the position with high accuracy at the time of the turning of the agricultural working.

In addition, in the case where the working machine is stopping, the output part 34 stops the calculation of the hybrid navigation system and then outputs the last direction obtained just before the stopping. In this manner, in the case where the working machine is stopping, the working machine or the like can obtain an accurate direction.

Further, in the case where the working machine is in the backward traveling state, the direction of the backward traveling is calculated by inverting the direction of the forward traveling by 180 degrees in the Kalman filter (the hybrid navigation system). In this manner, the working machine can easily obtain the direction of the working machine at the time of the backward traveling. In the embodiment, it is possible for the working machine or the like to obtain the positioning information with high accuracy on the basis of the traveling state in the case where the working machine is traveling automatically, and thus it is possible to accurately perform the autonomous traveling of the working machine.

Second Embodiment

Figure 5:
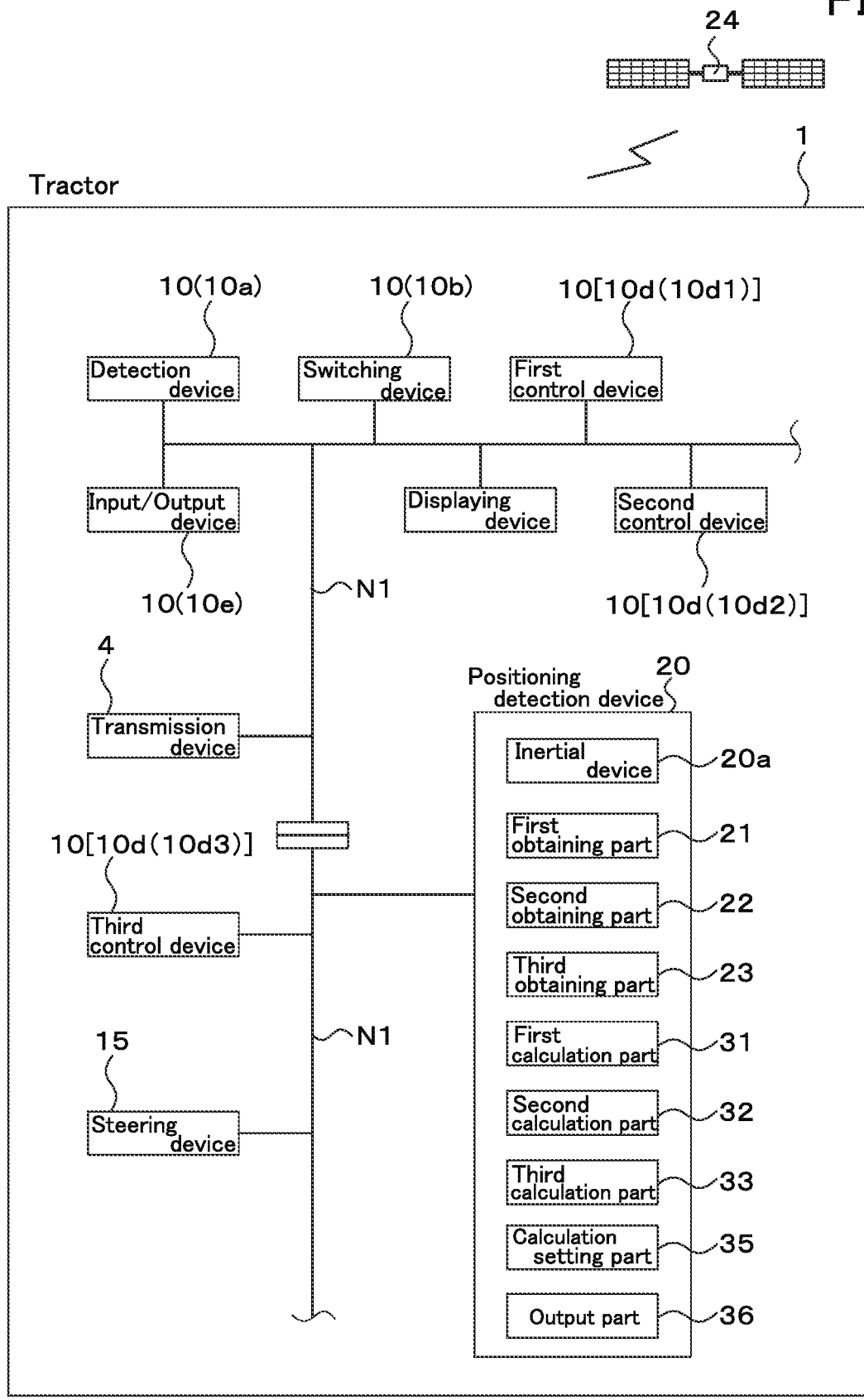
FIG. 5 is a view illustrating a block diagram of a tractor and a positioning detection device according to a second embodiment of the present invention.

FIG. 5 shows a block diagram of a tractor and a positioning detection device according to a second embodiment of the present invention. The positioning detection device and the working machine according to the second embodiment can be applied to the positioning detection device and the working machine according to the first embodiment described above. The description of the same configuration as that of the first embodiment will be omitted.

As shown in FIG. 5, the positioning detection device 20 includes an inertial device 20a, a first obtaining part 21, a second obtaining part 22, a third obtaining part 23, a first calculation part 31, a second calculation part 32, and a third calculation part 33. In addition, the positioning detection device 20 includes an calculation setting part 35 and an output part 36. The calculation setting part 35 is constituted of electronic parts, electric parts, computer programs, and the like provided in the positioning detection device 20. The calculation setting part 35 makes settings relating to the calculation processing by the first calculation part 31, the second calculation part 32, and the third calculation part 33. In particular, the calculation setting part 35 determines whether or not to execute the calculation processing of the first calculation part 31, whether or not to execute the calculation processing of the second calculation part 32, and whether or not to execute the calculation processing of the third calculation part 33. Note that the traveling state of the tractor 1 is the state of the vehicle body 2 such as the straight traveling (the forward traveling and the backward traveling), the turning, the stopping, and the like as in the first embodiment, and in the tractor 1 configured to perform the autonomous traveling, the traveling state of the tractor 1 is the traveling information obtained from the third control device 10d3 by the third obtaining part 23.

Hereinafter, referring to the traveling state of the tractor 1, the setting of the calculation processing by the calculation setting part 35 will be described.

As shown by a straight-traveling state A1 in FIG. 4, when the third obtaining part 23 obtains one of the straight-traveling (the forward traveling and the backward traveling), the calculation setting part 35 determines to perform the calculation processing by the third calculation part 33. More specifically, in the autonomous traveling of the tractor 1, when the tractor 1 is in any one of the straight traveling states (the forward traveling state and the backward traveling state), the calculation setting part 35 determines to calculate the position, the speed, and the direction of the vehicle body 2 in accordance with the hybrid navigation system. That is, in response to the determination by the calculation setting part 35, the third calculation part 33 executes the calculation of the position, the speed, and the direction as the third positioning information in the case where the tractor 1 is at least traveling straight ahead.

As shown in the turning state A2 in FIG. 4, the calculation setting part 35 does not execute the calculation processing by the third calculation part 33 in the case where the third obtaining part 23 obtains the turning, but executes the calculation processing by the first calculation part 31 and/or executes the calculation processing by the second calculation part 32.

Specifically, when the tractor 1 is turning from the state of straight traveling in the autonomous traveling of the tractor 1, the calculation setting part 35 determines to stop the calculation processing with respect to the third calculation part 33, and thereafter determines to calculate the direction in accordance with the inertial navigation system (the INS) of the second calculation part 32. In addition, when the tractor 1 is turning from the state of straight traveling in the autonomous traveling of the tractor 1, the calculation setting part 35 determines to calculate the position in accordance with the satellite navigation system (the GNSS) of the first calculation part 31. In other words, when the tractor 1 is in the turning state, the first calculation part 31 executes the calculation of the position in response to the determination of the operation setting part 35, and the second calculation part 32 executes the calculation of the direction.

Meanwhile, in the stopping state A3 in FIG. 4, the position and the speed are obtained by the first calculation part 31. In addition, in the stopping state A3 in FIG. 4, when the tractor 1 stops from a traveling state other than the turning state, the last direction obtained just before the stopping is fixed by the third calculation part 33 (the direction fixing). In the stopping state A4 of FIG. 4, when the tractor 1 stops halfway from the traveling state in which the tractor 1 is turning, the direction obtained by the second calculation part 32 is fixed (the direction fixing).

As described above, the output part 36 outputs the positioning information calculated in accordance with the traveling state to the outside. For example, when the tractor 1 is in the straight traveling state A1, the output part 36 outputs the third positioning information (the position, the speed, the direction) obtained in accordance with the hybrid navigation system to the in-vehicle network. In addition, when the tractor 1 is in the turning state A2, the output part 36 outputs the first positioning information (the position) obtained in accordance with the satellite navigation system (the GNSS) and the second positioning information (the direction) obtained in accordance with the inertial navigation system (the INS). In addition, when the tractor 1 is in the stopping state, the output part 36 outputs the last direction just before the stopping of the tractor 1 as the direction of the tractor 1. In addition, in the case where the tractor 1 is in the stopping state, the output part 36 outputs, as the position and the speed, the position and the speed obtained by the first calculation part 31. Meanwhile, the output part 36 outputs the positioning information to the third control device 10d3 (the in-vehicle network), but in addition to that, the positioning information may be obtained outside the tractor 1. That is, an external output terminal may be provided to the positioning detection device 20, and may output the positioning information to the external output terminal.

As described above, the positioning detection device 20 includes the first calculation part 31, the second calculation part 32, the third calculation part 33, and the calculation setting part 35. Thus, the positioning information of the working machine can be obtained in accordance with the satellite navigation system, the inertial navigation system, the Kalman filter (the hybrid navigation system), and the positioning suitable for the traveling state of the working machine can be performed. For example, in the case where the working machine is traveling straight ahead, by obtaining the position and the direction in accordance with the hybrid navigation system, the working machine or the like can obtain the position and direction with high accuracy at the time of the straight traveling. In addition, in the case where the working machine is turning, the direction is obtained in accordance with the inertial navigation system, and the position is further obtained in accordance with the satellite navigation system so that the position and the direction with high accuracy at the time of the turning can be obtained.

Third Embodiment

Figure 6:
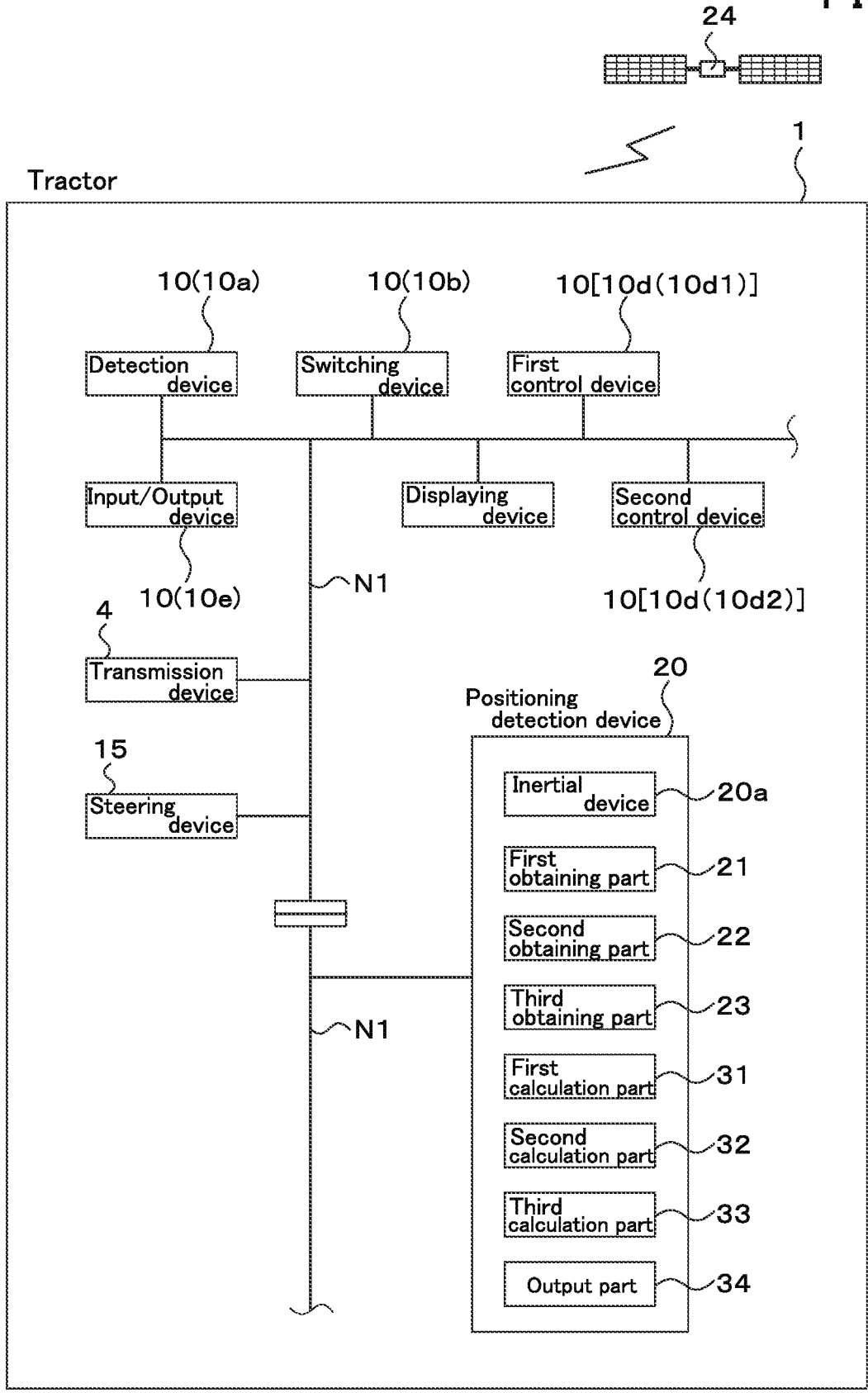
FIG. 6 is a view illustrating a block diagram of a tractor and a positioning detection device according to a third embodiment of the present invention.

FIG. 6 is a block diagram of a tractor and a positioning detection device according to a third embodiment of the present invention. The positioning detection device and the working machine described in the third embodiment can be applied to the positioning detection device and the working machine according to the first embodiment or the second embodiment described above. Explanations of the same configurations as those of the first embodiment and the second embodiment will be omitted. The positioning detection device according to the third embodiment provides an embodiment of a tractor not provided with the third control device 10d3.

As shown in FIG. 6, the control device 10d includes a first control device 10d1 and a second control device 10d2. The positioning detection device 20 includes an inertial device 20a, a first obtaining part 21, a second obtaining part 22, a third obtaining part 23, a first calculation part 31, a second calculation part 32, a third calculation part 33, and an output part 34. The inertial device 20a, the first calculation part 31, the second calculation part 32, the third calculation part 33, the first obtaining part 21, and the second obtaining part 22 are the same as those of the first embodiment and the second embodiment.

The third obtaining part 23 is configured to obtain the traveling information of the tractor 1 from the detection device 10a or from the first control device 10d1. The third obtaining part 23 obtains the detection value of the shift lever detection sensor, the detection value of the steering angle sensor, and the detection value of the axle rotation sensor which are the traveling information through the in-vehicle network or the like. In this manner, the third obtaining part 23 can obtain that the tractor 1 is stopping, traveling straight (the forward traveling and the backward traveling), or turning.

Alternatively, the first control device 10d1 judges that the tractor 1 is stopping, traveling straight (the forward traveling and the backward traveling), or turning on the basis of various detection values obtained by the detection device 10a or the like. The first control device 10d1 outputs the traveling information to the in-vehicle network, the traveling information being the result of the judgment. The third obtaining part 23 obtains the traveling information outputted to the in-vehicle network by the first control device 10d1. Meanwhile, the obtaining of the traveling information by the third obtaining part 23 is not limited to the above-described manner, but the third obtaining part 23, for example, may directly obtain from the steering device 15 whether the tractor is turning or not, obtain from the transmission device 6 whether the tractor is traveling forward or traveling backward, and obtain from other devices the traveling information representing the traveling state.

As described above, according to the positioning detection device 20, accurate positioning information can be provided on the basis of the traveling state even when the working machine is not in the autonomous traveling.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A positioning detection device comprising:
a first obtaining circuit disposed on a vehicle body having a working device or on the working device and configured to obtain a satellite signal from a navigation satellite;
a second obtaining circuit to obtain a detection signal of an inertial device;
a third obtaining circuit to obtain a traveling state of the vehicle body, the traveling state including at least straight-traveling of the vehicle body and turning of the vehicle body;
a first calculator to calculate first positioning information in accordance with a satellite navigation system to which the satellite signal obtained by the first obtaining circuit is applied, the first positioning information being information on positioning;
a second calculator to calculate second positioning information in accordance with an inertial navigation system to which the detection signal obtained by the second obtaining circuit is applied, the second positioning information being information on positioning;
a third calculator to calculate third positioning information in accordance with a hybrid navigation system to which the first positioning information and the second positioning information are applied, the third positioning information being information on positioning; and an output circuit to
- output the third positioning information when the third obtaining circuit obtains the straight-traveling of the vehicle body, the third positioning information being calculated by the third calculator, and
- output the first positioning information and/or the second positioning information when the third obtaining circuit obtains the turning of the vehicle body, the first positioning information being calculated by the first calculator, the second positioning information being calculated by the second calculator.

2. The positioning detection device according to claim 1, wherein the straight-traveling of the vehicle body includes forward traveling and backward traveling of the vehicle body,
wherein the output circuit
- outputs a first position and a first direction calculated as the third positioning information by the third calculator when the third obtaining circuit obtains the forward traveling of the vehicle body, and
- outputs the first position and a second direction reverse to the first direction when the third obtaining circuit obtains the backward traveling of the vehicle body.

3. The positioning detection device according to claim 1, wherein the output circuit
- outputs a position and a direction calculated as the third positioning information by the third calculator when the third obtaining circuit obtains the straight-traveling of the vehicle body, and
- outputs a direction calculated as the second positioning information by the second calculator when the third obtaining circuit obtains the turning of the vehicle body.

4. The positioning detection device according to claim 1, wherein the output circuit outputs a position calculated as the first positioning information by the first calculator when the third obtaining circuit obtains the turning of the vehicle body.

5. The positioning detection device according to claim 1, wherein the third obtaining circuit obtains, as the traveling state, a stopping state of the vehicle body, and
wherein the output circuit outputs a last direction calculated as the third positioning information by the third calculator, just before the vehicle body is stopped, in a case where the third obtaining circuit obtains the stopping state after obtaining the traveling state other than the turning of the vehicle body.

6. The positioning detection device according to claim 1, wherein the third obtaining circuit obtains, as the traveling state, a stopping state of the vehicle body, and
wherein the output circuit outputs a last direction calculated as the second positioning information by the second calculator, just before the vehicle body is stopped, in a case where the third obtaining circuit obtains the stopping state after obtaining the turning of the vehicle body.

7. The positioning detection device according to claim 1, wherein the third obtaining circuit obtains, as the traveling state, a stopping state of the vehicle body,
wherein the output circuit outputs a position calculated as the first positioning information by the first calculator when the third obtaining circuit obtains the stopping state of the vehicle body.

8. The positioning detection device according to claim 3, wherein the third obtaining circuit
- obtains forward traveling or backward traveling as the straight-traveling of the vehicle body, and
- obtains a direction of the backward traveling by reversing a direction of the forward traveling in a case where the third calculation circuit calculates the direction of the backward traveling after the third obtaining circuit obtains the backward traveling of the vehicle body.

9. A positioning detection device comprising:
a first obtaining circuit disposed on a vehicle body having a working device or on the working device and configured to obtain a satellite signal from a navigation satellite;
a second obtaining circuit to obtain a detection signal of an inertial device;
a third obtaining circuit to obtain a traveling state of the vehicle body, the traveling state including at least straight-traveling of the vehicle body and turning of the vehicle body;
a first calculator to calculate first positioning information in accordance with a satellite navigation system to which the satellite signal obtained by the first obtaining circuit is applied, the first positioning information being information on positioning;
a second calculator to calculate second positioning information in accordance with an inertial navigation system to which the detection signal obtained by the second obtaining circuit is applied, the second positioning information being information on positioning;
a third calculator to calculate third positioning information in accordance with a hybrid navigation system to which the first positioning information and the second positioning information are applied, the third positioning information being information on positioning; and
a calculation setting circuit to perform calculation processes of the first calculator, the second calculator, and the third calculator, the calculation setting circuit being configured to
- perform the calculation process of the third calculator when the third obtaining circuit obtains the straight-traveling of the vehicle body, and
- stop the calculation process of the third calculator when the third obtaining circuit obtains the turning of the vehicle body and to start the calculation process of the first calculator and/or the calculation process of the second calculator.

10. The positioning detection device according to claim 9, wherein the straight-traveling of the vehicle body includes forward traveling and backward traveling of the vehicle body,
wherein the calculation setting circuit is configured to perform the calculation process of the third calculator so that the output circuit
- outputs a first position and a first direction calculated as the third positioning information by the third calculator when the third obtaining circuit obtains the forward traveling of the vehicle body, and
- outputs the first position and a second direction reverse to the first direction when the third obtaining circuit obtains the backward traveling of the vehicle body.

11. The positioning detection device according to claim 9, wherein the calculation setting circuit
- performs the calculation process of the second calculator to calculate a direction as the second positioning information when the third obtaining circuit obtains the turning of the vehicle body, and
- performs the calculation process of the third calculator to calculate a position, a speed, and the direction as the third positioning information when the third obtaining circuit obtains the straight-traveling of the vehicle body.

12. The positioning detection device according to claim 9, wherein the calculation setting circuit
performs the calculation process of the first calculator to calculate a position as the first positioning information when the third obtaining circuit obtains the turning of the vehicle body.

13. The positioning detection device according to claim 11,
wherein the third obtaining circuit
obtains forward traveling or backward traveling as the straight-traveling of the vehicle body, and
obtains a direction of the backward traveling by reversing a direction of the forward traveling in a case where the third calculation circuit calculates the direction of the backward traveling after the third obtaining circuit obtains the backward traveling of the vehicle body.

14. A working machine comprising:
a vehicle body;
a working device attached to the vehicle body; and
the positioning detection device according to claim 1.

15. A working machine comprising:
a vehicle body;
a working device attached to the vehicle body; and
the positioning detection device according to claim 9.

16. A positioning detection device, which is connected to a controller for controlling an operation of a working machine having a vehicle body and a working device attached thereto,
the positioning detection device being disposed on the vehicle body or the working device and configured to be controlled by a program to,
obtain a satellite signal from a navigation satellite;
obtain a detection signal of an inertial device;
obtain a traveling state of the vehicle body, the traveling state including at least straight-traveling of the vehicle body and turning of the vehicle body;
calculate first positioning information in accordance with a satellite navigation system to which the satellite signal is applied;
calculate second positioning information in accordance with an inertial navigation system to which the detection signal is applied;
calculate third positioning information in accordance with a hybrid navigation system to which the first positioning information and the second positioning information are applied;
output the third positioning information to the controller upon obtaining the straight-traveling of the vehicle body; and
output the first positioning information and/or the second positioning information to the controller upon obtaining the turning of the vehicle body.

17. A working machine comprising:
a vehicle body;
a working device attached to the vehicle body; and
the positioning detection device according to claim 16.

* * * * *